(12) United States Patent
Rejc

(10) Patent No.: US 8,079,399 B2
(45) Date of Patent: Dec. 20, 2011

(54) HIGH-SPEED INDUSTRIAL DOOR WITH A FLEXIBLE CURTAIN

(75) Inventor: Petra Rejc, Landshut (DE)

(73) Assignee: EFAFLEX Tor-und Sicherheitssysteme GmbH & Co. KG, Bruckberg (DE)

( * ) Notice: Subject to any disclaimer, the term of this patent is extended or adjusted under 35 U.S.C. 154(b) by 1539 days.

(21) Appl. No.: 10/523,631

(22) PCT Filed: Mar. 26, 2003

(86) PCT No.: PCT/EP03/03149
§ 371 (c)(1),
(2), (4) Date: Feb. 4, 2005

(87) PCT Pub. No.: WO2004/018820
PCT Pub. Date: Mar. 4, 2004

(65) Prior Publication Data
US 2005/0269045 A1      Dec. 8, 2005

(30) Foreign Application Priority Data
Aug. 9, 2002    (DE) .................................. 102 36 648

(51) Int. Cl.
*A47H 1/00* (2006.01)
(52) U.S. Cl. ......... 160/201; 160/264; 160/267; 160/270
(58) Field of Classification Search .................. 160/264, 160/267, 270, 271, 274, 133, 310
See application file for complete search history.

(56) References Cited

U.S. PATENT DOCUMENTS

| 1,987,488 | A |   | 1/1935  | Morelli   |         |
|-----------|---|---|---------|-----------|---------|
| 2,311,470 | A |   | 2/1943  | Ritter    |         |
| 5,394,924 | A | * | 3/1995  | Rejc      | 160/201 |
| 5,484,007 | A | * | 1/1996  | Rejc      | 160/133 |
| 5,488,982 | A | * | 2/1996  | Rejc      | 160/133 |
| 6,218,940 | B1|   | 4/2001  | Rejc et al.|        |
| 6,243,006 | B1|   | 6/2001  | Rejc et al.|        |
| 6,363,993 | B1| * | 4/2002  | Aquilina  | 160/229.1|
| 6,659,158 | B2|   | 12/2003 | Laugenbach |        |
| 7,111,661 | B2|   | 9/2006  | Laugenbach |        |
| 2002/0139491 | A1 | | 10/2002 | Langenbach |      |

(Continued)

FOREIGN PATENT DOCUMENTS

DE          27 52 777        6/1978

(Continued)

OTHER PUBLICATIONS

German Office Action dated Jan. 13, 2011, issued in corresponding German Application No. 102 36 648.9-25 with English Translation.

*Primary Examiner* — Katherine Mitchell
*Assistant Examiner* — Candace L Bradford
(74) *Attorney, Agent, or Firm* — Nixon & Vanderhye PC

(57) ABSTRACT

A high-speed industrial door includes a door leaf having a plurality of stiffening profiles and a flexible curtain. Each stiffening profile extends crosswise relative to a lateral passing over the door leaf and connects two hinge elements assigned to one another. A flexible curtain is fixed to each stiffening profile. This makes it possible to provide a high-speed industrial door that can be operated at speeds faster than 3 m/s while involving little engineering complexity and low costs.

11 Claims, 4 Drawing Sheets

U.S. PATENT DOCUMENTS

2002/0148571 A1 10/2002 Langenbach

FOREIGN PATENT DOCUMENTS

| | | |
|---|---|---|
| DE | 88 08 704 | 12/1989 |
| DE | 39 39 231 | 11/1990 |
| DE | 40 15 215 | 11/1991 |
| DE | 40 15 216 | 11/1991 |
| DE | 49 15 214 | 11/1991 |
| DE | 296 15 538 | 11/1996 |
| DE | 197 58 648 | 12/1998 |
| DE | 197 39 543 | 3/1999 |
| DE | 197 39 544 | 3/1999 |
| DE | 199 15 376 | 10/2000 |
| GB | 796502 | 6/1958 |

\* cited by examiner

HIGH-SPEED INDUSTRIAL DOOR WITH A FLEXIBLE CURTAIN

BACKGROUND

This application is the US national phase of international application PCT/EP2003/003149 filed 26 Mar. 2003 which designated the U.S. and claims benefit of DE 102 36 648.9, filed 9 Aug. 2002, the entire content of which is hereby incorporated by reference.

1. Technical Field

The invention relates to a fast-moving industrial gate with a gate body covering the gateway and having on either side a strap hinge with a multiplicity of hinge members that are interconnected such that they may be oriented at a relative angle, which are guided by rollers in lateral guides guiding the gate body free of contact.

2. Related Art

Fast-moving rolling gates employing coiling of the gate body above the gateway are known in practical use. These are, for example, rolling gates wherein a hanging of plasticized PVC or of a similar soft synthetic material is coiled on a coiling shaft in the customary manner and may be reeled off for closing the gateway. Such rolling gates were found to be excellently suited in practical use and are variously utilized as they may be furnished at low cost, and the gate body having the form of a hanging may moreover entirely or in parts be made transparent. Thus, e.g., the area on the other side of the gate body is also visible to a forklift driver, so that impediments or dangers may largely be avoided even if this rolling gate is to be passed through from both sides at the same time. It is another advantage of such plasticized PVC rolling gates that the gate body has a very low weight, so that the energy consumption for operating the gate may be kept low, and the dynamic loads during opening and closing of the gate are also limited. Therefore velocities of approx. 2 m/s are readily possible with the like rolling gates, so that they are also suited as a temporary closure between two consecutive passages.

The turns of the gate body having the form of a hanging in the case of such plasticized PVC rolling gates do, however, come to lie directly on each other in the coil and are accordingly scratched and soiled. Hereby the transparency of the hanging is degraded considerably in the course of time. Another drawback of these rolling gates is that this hanging, although usually held by the lateral edges in vertical guides, tends to bulge in the center region at higher wind forces owing to stretch of the material in the center region. From a certain wind load upwards, or even in the event of some other manual influence, the lateral edges of the hanging may come free from the vertical guides of the gateway. Damage to the hanging may then occur, and it moreover generally turns out to be problematic to reintroduce the hanging into the guides. It is a further drawback in such a plasticized PVC rolling gate that it moreover is usually not capable of being combined with a safety system in the manner of a gate light barrier as known, e.g., from DE 197 39 543 A and DE 197 39 544 A. The like gate light barriers generate accurately in the plane of closure of the gate a "light curtain" allowing to recognize obstacles free of contact, and thus avoid a collision. Owing to the flexibility and the thin wall of the hanging, however, this safety system can hardly be employed with such rolling gates including a flexible hanging, for the controls of the safety system detect the leading edge of the hanging and utilize it for recognizing an obstacle in the further path of closure of the gate.

Moreover from practical use a design for a rolling gate including a flexible hanging has become known, wherein several hanging segments are combined in order to form the flexible gate body. The edges of the hanging segments have a reinforcement strip-type configuration and each engage a respective connecting member coupling two hanging segments with each other. The hanging thus made up of several pieces is customarily coiled on a coiling shaft in the lintel. The arrangement of the connecting members within the hanging does, however, result in considerable irregularities that are of particular importance during the coiling process. This known rolling gate may therefore only be operated at a very low velocity of clearly less than one meter per second, and is moreover very noisy because clearly audible clattering noises occur when two connecting members meet in the coil. Such a rolling gate is generally not suited for fast-moving operation.

From practical use moreover a fundamentally different system for a fast-moving industrial gate is known, wherein a gate body formed of a multiplicity of aluminum lamellae that are interconnected such that they may be oriented at a relative angle is guided free of contact in the lintel range of the gateway. Thus the German patent applications DE 40 15 214 A, DE 40 15 215 A, and DE 40 15 216 A disclose a construction in which the lamellae of the gate body move with lateral rollers in guide rails. These are deflected at the top end of the gateway towards the inside of the gate into a straight guide section; following another downward deflection by 180 degrees they are again guided back in a straight line and then optionally again guided to the rear following a 180-degree upward deflection. This results in an elongate coil in which the lamellae of the gate body do, however, not lie on top of each other but are guided free of contact in a spaced-apart relation by the rollers in the guides. Lip seals are moreover arranged at the guides, which are contiguous with the gate body and thus establish a wind-tight closure for the gateway.

Another example for such a fast-moving industrial gate is known from DE 199 15 376 A1, wherein the lamellae are formed of extruded plastic and may be made transparent completely or only in a partial area. As these lamellae are formed of GRP or PMMA, for instance, they have a lower weight in comparison with conventional lamellae of aluminum. The use of these plastic lamellae of a pliant material is made possible, in accordance with this known industrial gate, in that the lamellae in the range of the gate lintel move into a spiral section having a continuously curved spiral shape, so that the dynamic loads of the gate body can be kept within limits. This industrial gate has been found to be very advantageous for many applications in practical use. Thus it is possible to reliably achieve high velocities of up to 3 m/s, while it is at the same time also possible to make the gate body substantially continuously transparent.

This industrial gate with plastic lamellae does, however, also suffer from drawbacks. Namely, these lamellae have such a low strength in comparison with aluminum lamellae that they are hardly suited for gate widths exceeding four meters. In addition, these plastic lamellae have a shorter lifetime than conventional aluminum lamellae. In particular it has been found that from a certain gate size upward, cracks may develop in the range in which the strap hinges are fastened to the lamellae. Another drawback in this design lies in the fact that the lamellae are extruded as a whole, so that there are limits to variation in terms of material. In particular the provision of these lamellae is connected with a considerable expense in terms of production technology and therefore relatively expensive. Moreover it is not possible to modify the constructional shape of the lamella without considerable expense; this requires the production of a new extrusion die for each case. Furthermore the transparent area in this known plastics lamella is not clear as glass owing to the production process, as in particular small but clearly recognizable processing traces in the direction of extrusion are unavoidable.

On the other hand the fast-moving industrial gate in accordance with DE 199 15 376 A1 is characterized by its capability of sustaining high wind loads, exemplary tightness, model reliability and high availability. Nevertheless in practice an even faster and yet affordable system is being demanded, which does, however, manage without any reductions of the advantageous properties of the known gate systems.

From U.S. Pat. No. 2,311,470 another gate closure in the manner of a lamellar shield is known, the gate body of which includes on either side a strap hinge with a multiplicity of hinge members that are interconnected such that they may be oriented at a relative angle, which are guided by rollers in lateral guides guiding the gate body free of contact. The gate body comprises a multiplicity of lamellae interconnected by means of rigid, semi-rigid, or flexible connecting strips which are affixed on the mutually facing longitudinal edges of the lamellae in positive engagement. Moreover the single lamellae extend transversely to the lateral guides across the gate body to thereby connect two respective associated hinge members.

BRIEF DESCRIPTION

An exemplary embodiment is therefore based on the object of further developing a fast-moving industrial gate in such a way as to be operable at velocities in excess of 3 m/s which may nevertheless be furnished with low complexity in terms of production technology and thus at low cost.

This object is achieved through a fast-moving industrial gate characterized in particular by the fact that the gate body includes a multiplicity of stiffening profile members and a flexible hanging, wherein each stiffening profile member extending transversely to the lateral guides across the gate body and connects two respective associated hinge members, and wherein the flexible hanging is affixed to each stiffening profile member.

Thus in accordance with an exemplary embodiment a way is disclosed for the first time how a reliable fast-moving operation is possible even with a gate body including a flexible hanging. To this end, the industrial gate in accordance with an exemplary embodiment essentially combines the guidance technology known from the fast-moving spiral gates with a hanging which, thanks to its low weight in comparison with lamellae, may be operated at low expense for energy and control. The high dynamic loads generally manifesting in fast-moving operation are thus reduced due to the lower weight of the gate body, and are in terms of construction moreover reliably absorbed through the interaction of the stiffening profile members with the strap hinges, i.e., with the supporting frame thus formed. The forces acting on the flexible hanging may thus be kept very low.

This is a fundamental turnaround from the principle of the plasticized PVC rolling gate as discussed at the outset, in which the flexible hanging does not have any stiffening elements, and all of the static as well as dynamic loads must be absorbed within the hanging. On the other hand, however, the approach in accordance with an exemplary embodiment is also a turnaround from the conventional design with lamellae, for what is left are merely stiffening profile members as a connection between two respective associated hinge members, wherein the stiffening profile members do not constitute a full-surface closure of the gateway.

The industrial gate in accordance with an exemplary embodiment thus combines the advantages of a conventional rolling gate of plasticized PVC or the like on the one hand, and of the spiral gates with lamellar gate bodies on the other hand. In particular it may be operated at a velocity of more than 4 m/s thanks to the lower weight of the gate body, wherein at the same time damages to the hanging need not be feared because the occurring loads are absorbed via the stiffening profile members and the strap hinges.

The industrial gate in accordance with an exemplary embodiment may moreover also be furnished at a substantially lower cost than a conventional spiral gate with lamellae, for the high expense in terms of production technology for furnishing the lamellae does not exist. The stiffening profile members, on the other hand, may be provided as simple deep-drawn components having a rod shape and cut to length in accordance with the respective gate width. Owing to the possible inherent stability of the stiffening profile members even gate widths of six or eight meters are possible.

In addition, soiling or scratching of the flexible hanging is reliably avoided in that the gate body is guided entirely free of contact. The flexible hanging may therefore also readily be made transparent without the transparency of the hanging being compromised or lost in the course of time. As the flexible hanging is moreover affixed at each stiffening profile member, pressure differences between the spaces to be partitioned by the industrial gate or possibly occurring wind loads may moreover reliably be absorbed without causing significant bulging of the hanging.

The industrial gate in accordance with an exemplary embodiment may therefore be operated practically free of wear and in addition produces little noise thanks to the time-proven guidance technology. Furthermore it may, other than with conventional rolling gates including a flexible hanging, also be combined with a security device such as a gate light barrier, so that precisely at the high opening and closing speed of approx. 4 m/s, danger to persons may nevertheless reliably be avoided. As the flexible hanging used in accordance with an exemplary embodiment moreover does not have to absorb any forces involved in moving the gate body, it may be optimized with regard to its weather and temperature strength. Thus a particularly high lifetime may be achieved.

Advantageous developments of the industrial gate in accordance with an exemplary embodiment are subject matter of the dependent claims.

Thus the hanging may be subdivided into several hanging segments, whereby the expense for maintenance and, where necessary, a repair of the hanging is substantially reduced. In such a case merely the damaged hanging segment needs to be replaced while the further hanging segments are not involved. Such a repair may therefore be performed rapidly and at low cost. It is furthermore advantageous that transparent and non-transparent hanging segments as well as hanging segments having different coloring, inscriptions, etc. may be combined at will, so that the respective requirements and individual desires of the user of the industrial gate in accordance with an exemplary embodiment may be taken into account. Thus it is possible, for instance, to provide a transparent area about at head height so that it is possible to recognize whether or not, e.g., a forklift is already approaching on the other side of the gate body.

Due to the fact that the hanging is affixed across the entire gate width at a respective adjacent stiffening profile member, bulging of the hanging, for example under a wind load, is avoided even more reliably, so that the hanging coming loose from lateral guides and/or damage to the hanging may even better be precluded. In particular, undesirable stretch within the material of the hanging may thus be avoided reliably.

It is a further advantage if the hanging is affixed at the respective adjacent stiffening profile member in positive engagement. This allows for a particularly reliable and durable connection between these parts that may be realized with the aid of simple constructive means.

Furthermore the hanging may include in the range of each stiffening profile member a reinforcing strip that engages in an undercut groove at the associated stiffening profile member. Use is thus made of a time-proven technology which is characterized by its particularly high reliability and may yet be produced at low cost.

It is furthermore advantageous if a reinforcing strip is welded to the hanging in the areas of the gate body in which the hanging runs over a stiffening profile member. Hereby a reliable connection between the hanging and the associated stiffening profile member is produced with the aid of few elements, without the continuity of the hanging on its other surface being degraded. This results in a particularly good aesthetic appearance of the industrial gate in accordance with an exemplary embodiment. In addition, a reliable, stable, and durable attachment of the reinforcing strip at the hanging is achieved by the welding process which in particular is a high-frequency welding. The hanging need not be pierced or recessed for this purpose, and consequently there are no spots of reduced strength inviting an eventual formation of cracks or the like.

Furthermore one respective reinforcing strip is formed on the edge sides of the hanging or of each hanging segment, which runs in parallel with the associated stiffening profile member, so that the edges may also reliably and durably be affixed to the respective associated stiffening profile member.

It is a further advantage if the ends of each stiffening profile member engage in the hinge members so as to be accommodated therein when viewed in the direction of depth of the gate body, with their sides facing the hanging substantially being flush with the surfaces of the hinge members. Hereby the "support frame" of the gate body of the industrial gate in accordance with an exemplary embodiment is given, on the side facing the hanging, a substantially flush configuration without any projecting elements, so that the risk of damage to the hanging, for example by getting caught on objects present in front of the hanging, may reliably be avoided. This furthermore results in the closed condition of the gate body in a smoothly continuous hanging plane essentially defined by the extension of the major surface of the hanging, so that particularly reliable sealing of the hanging in the range of the lateral guides may be brought about by simple constructive means. Moreover the optical appearance of the gate body is thus improved.

If the lateral guides include a spiral section in the lintel range of the gateway, then the gate body may be accommodated above the lintel at a high speed and in a space-saving manner when the gate is opened. In particular the industrial gate in accordance with an exemplary embodiment will then not occupy a major section in the range of the room ceiling, which would be the case, e.g., with the elongated coil known from the prior art, or with flat guidance along the ceiling. Moreover in the case of a continuously curved spiral shape of the spiral section, particularly good dynamic conditions for movement of the gate body may be obtained, so that higher velocities are possible while nevertheless a very high lifetime and reliability is achieved.

Furthermore in the closed condition of the gate body there are a hinge plane and a hanging plane, wherein the hinge plane is substantially defined by pivot axes of the hinge members that are interconnected such that they may be oriented at a relative angle, and the hanging plane is substantially defined by the extension of the major surface of the thin hanging, with the hinge plane and the hanging plane not coinciding. Thus it is possible to furnish the industrial gate in accordance with an exemplary embodiment at even lower expense in terms of technology and manufacture.

In an exemplary embodiment, the hinge plane and the hanging plane are arranged in immediate vicinity of each other. In particular the hanging plane is spaced apart from the hinge plane only as far as required owing to the physical dimensions of the hinge members. This approximates the ideal case for avoiding stresses within the hanging, namely, the hinge plane immediately coinciding with the hanging plane, within the framework of what is possible in terms of construction. As an additional result it is hereby achieved that upon deflection of the hanging in the lintel range of the gate, and particularly also in the case of an arrangement in a spiral section, a significant reduction of length does not occur, so that there is hardly any inward flexure of the flexible hanging towards the center of the spiral.

If the flexible hanging is affixed at the stiffening profile members in respective locations adjacent a pivot axis of the hinge members that are interconnected such that they may be oriented at a relative angle, overhang of the flexible hanging between two locations of attachment at the stiffening profile members in the range of deflection above the lintel or within a spiral section may be reduced even further. The risk of damage to the hanging may thus be reduced further.

BRIEF DESCRIPTION OF THE DRAWINGS

An exemplary embodiment shall in the following be explained in more detail by way of practical examples while making reference to the figures of the drawings, wherein.

DETAILED DESCRIPTION

Figure 1:
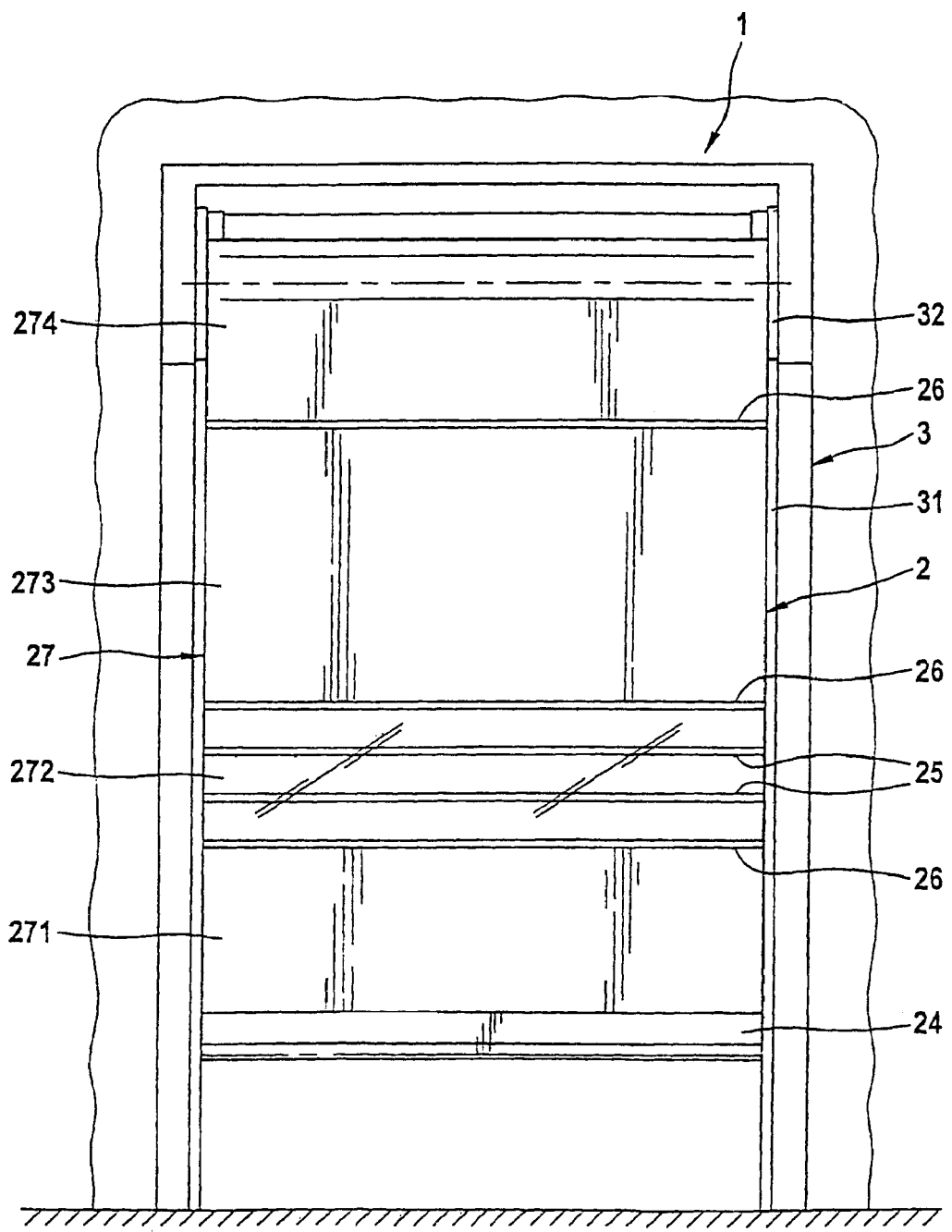
FIG. 1 is a front view of the industrial gate in accordance with an exemplary embodiment.
Figure 2:
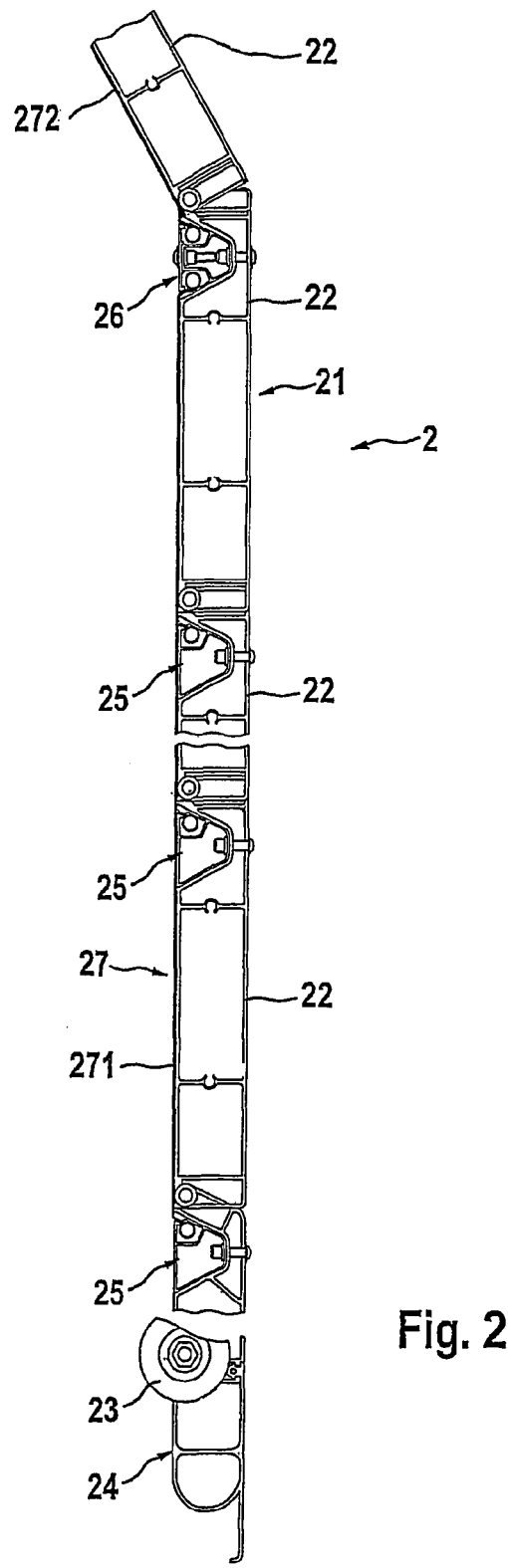
FIG. 2 is a sectional view of a part of the gate body.

In accordance with the representation in FIG. 1, a fast-moving industrial gate 1 includes a gate body 2 accommodated in a framing 3 and guided on both sides. The lateral guides in the framing 3 include a vertical section 31 in the range of the gateway and a spiral section 32 in the lintel range of the gateway. The gate body 2 has on each side one strap hinge 21 which is shown in FIG. 2 and in turn includes a multiplicity of hinge members 22 that are interconnected such that they may be oriented at a relative angle. The latter are guided in the lateral guides by means of rollers 23, with FIG. 2 merely showing one roller for clarification. The components and their functions for guiding the gate body 2 substantially correspond to the construction known from DE 199 15 376 A1, so that a detailed explanation will presently not be given. The gate body 2 moreover includes a floor-side terminating element 24.

As may be seen in the figures, the gate body moreover contains two kinds of stiffening profile members, namely, a first stiffening profile member 25 having an undercut groove 251 and a second stiffening profile member 26 having two undercut grooves 261 and 262. Moreover the gate body 2 contains a flexible hanging 27 which in this exemplary embodiment in accordance with the representation in FIG. 1 includes four hanging segments 271 through 274. These hanging segments 271 through 274 extend across a different number of stiffening profile members 25, i.e., they have respective predetermined widths, while their respective edges meet at stiffening profile members 26 and are affixed there. As may particularly be seen in FIGS. 2 to 4, the hanging segments have for this purpose edge-side reinforcing strips 275 as well as reinforcing strips 276 applied to the hanging with the aid of a welding process, whereby they are held in the grooves 251 and 261 and 262 in the stiffening profile members 25 and 26, respectively.

The stiffening profile member 25 is just like the stiffening profile member 26, accommodated flush within the respective hinge members 22 such that its surface facing the hanging 27 is presented substantially flush with the corresponding surface of the hinge member 22. The stiffening profile members 25 and 26 are screwed to the hinge members 22 on the side facing away from the hanging 27.

Figure 3:
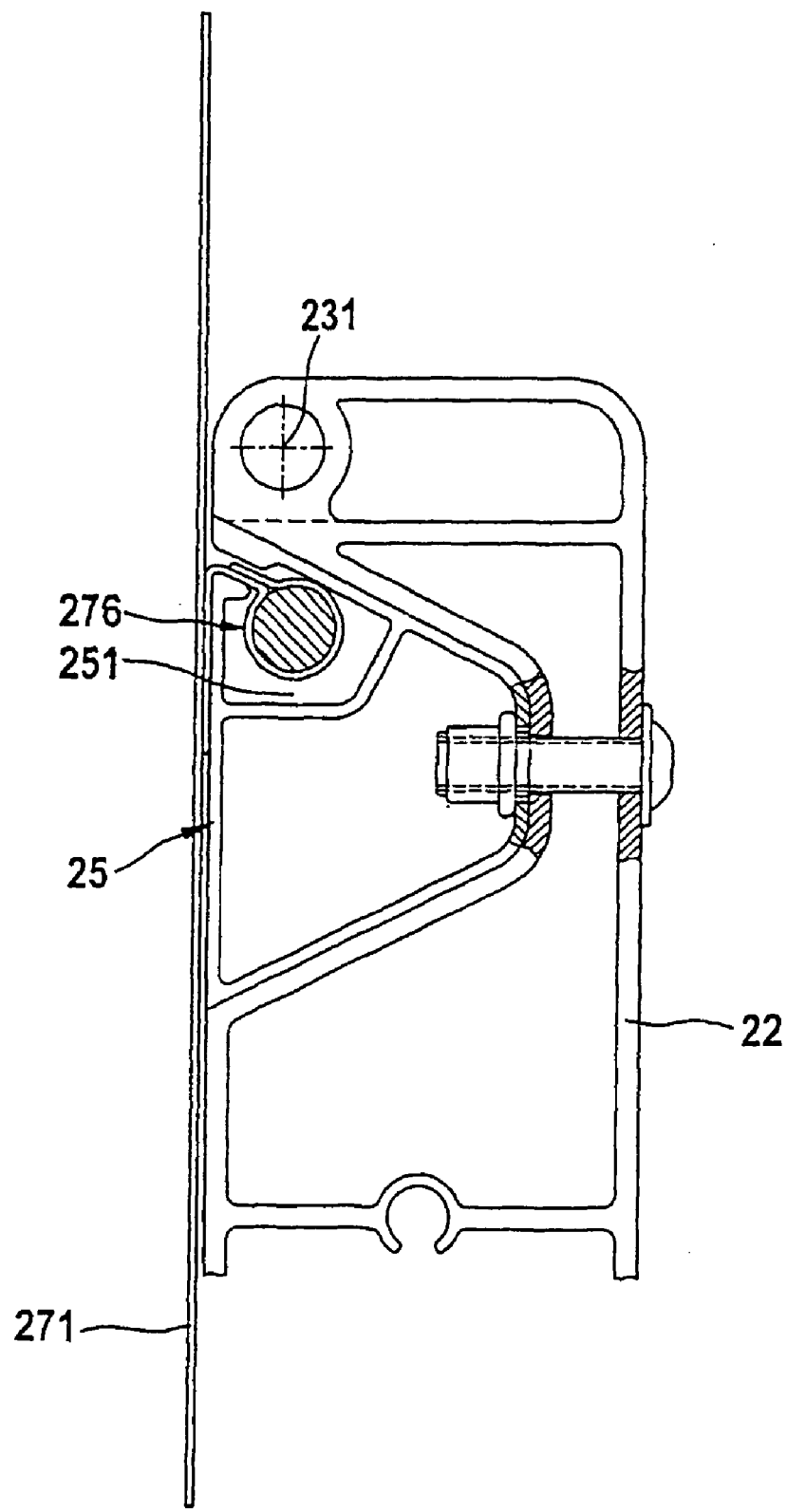
FIG. 3 is a detail of a hinge member with a stiffening profile member in a first variant.

As may be seen in FIGS. 2 and 3, the applied reinforcing strips 276 are arranged at the associated hanging segment in such a way as to meet the groove 251 in the stiffening profile member 25 as accurately as possible and establish a positive connection. As may be seen in FIGS. 2 and 4, edge-side reinforcing strips 275 are positively received by two adjacent hanging segments in the grooves 261 and 262 of the stiffening profile member 26. These edge-side reinforcing strips 275 are formed by folding over an edge portion of the respective hanging segment, so as to receive the string for the reinforcing strip, and welding. As is moreover visible particularly in FIG. 4, the stiffening profile member 26 is formed in two parts of base body 263 and a cover 264, with the cover 264 being removably connected with the base body 263 by screws. For replacing or repairing single hanging segments, it is possible to remove this cover 264.

The reinforcing strips 275 and 276 are formed continuously over the entire gate width, so that they hold the hanging 27, again across the entire gate width, at the associated stiffening profile member 25 and 26, respectively.

Figure 4:
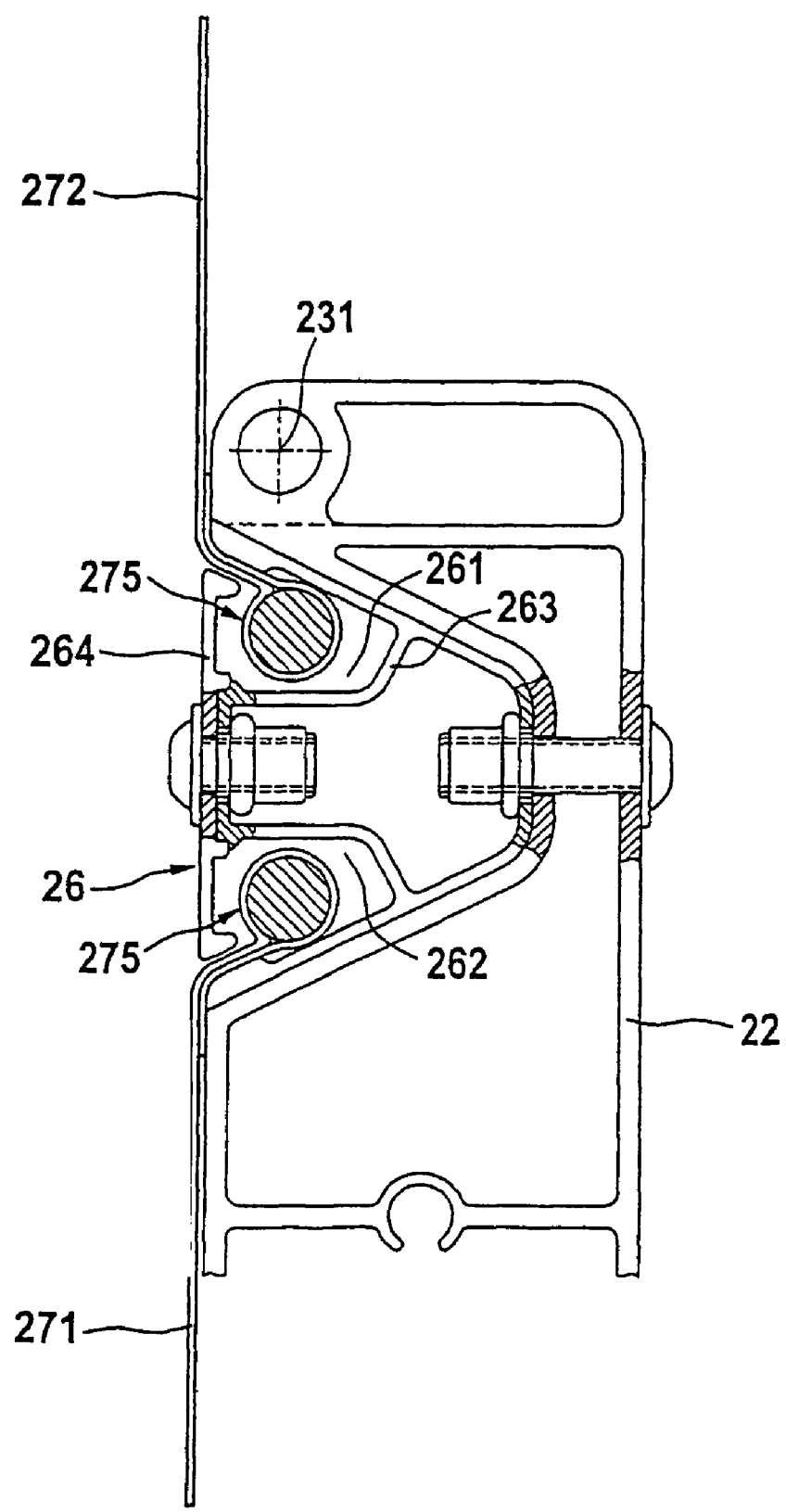
FIG. 4 is a detail of a hinge member with a stiffening profile member in a second variant.

As may be seen particularly in FIGS. 3 and 4, the reinforcing strips 275 and 276 come to lie adjacent the rotary axes of the rollers 23 which at the same time form the pivot axes 231 of the hinge members 22. Likewise, the hanging 27 is in the best possible constructive manner approximated to the pivot axis 231.

As is particularly visible in FIG. 1, the hanging 27 thus arranged covers substantially the entire surface of one side of the gate body 2, wherein it is possible to exchange single hanging segments without having to disassemble the whole of the gate body 2 for this purpose. Moreover in the present practical example the hanging segment 272 is made transparent in order for the area of the other side of the gate to be visible.

The transparent hanging segment 272 is made of PVC or the like. The non-transparent hanging segments 271, 273 and 274 are formed, e.g., of fabric-reinforced PVC or a similar material. In the same way, the applied reinforcing strips 276 are also formed, e.g., of PVC so as to provide a good welding capability with the respective hanging segment.

In practical experimentation it was moreover found that accurately positioning the applied reinforcing strips 276 on the hanging segments 271 through 274 is helpful in order to be able to keep the hanging as a whole free of stresses and thus increase the service life. As the reinforcing strips 275 and 276 extend across the entire gate width, this requires special measures in terms of device technology at the high-frequency welding machine or the like, so as to be able to maintain the division of customarily 225 mm, predetermined by the hinge members 22, across the entire width of the gate.

Besides the shown embodiment, the invention allows for additional configuring approaches.

Thus the industrial gate 1 in accordance with an exemplary embodiment may also be equipped with a safety system in the manner of a gate light barrier, for the hinges 21 on either side provide a sufficient thickness of the gate body for the individual light beams lying accurately in the closure plane of the gate body to be reliably sensed or blocked and thus evaluated by the controls.

Furthermore it is also possible to not subdivide the hanging into segments but make it continuous in one piece. As an alternative, the hanging segments may also be configured such that they only connect two respective adjacent stiffening profile members, i.e., without covering any stiffening profile members 25. In addition the locations of attachment of the hanging on the stiffening profile members need not be formed by reinforcing strips extending over the entire gate width, but may also have a point shape. Instead of the reinforcing strips, a fixation of the hanging on the stiffening profile members of a type is moreover conceivable where a retaining element is placed on the hanging and screw-connected with the hinge members through the hanging.

The reinforcing strips 275 and 276 might also be formed or applied by bonding or mechanically through sewing or the like.

Moreover it is also possible to guide the gate body 2 in the lintel range of the gateway on an elongate coil, or without overlap, in an elongate configuration along the ceiling.

While the hanging 27 is in the preferred embodiment arranged in closest possible proximity of the pivot axes 231 of the functional hinge members so as to prevent major stresses in the hanging in the extended condition, as well as major bulging of the hanging during angular relative movements of the hinge members, the pivot axes may also be provided to be spaced apart farther from the hanging, e.g., centrally on the respective hinge member. In the case of such a modification, however, care should be taken to form the hanging of a material that is capable of permanently withstanding the occurring loads.

The invention claimed is:

1. Industrial gate with a gate body covering a gateway and having on either side a strap hinge with a multiplicity of hinge members that are interconnected such that they may be oriented at a relative angle, which are guided by rollers in lateral guides guiding said gate body free of contact,
   wherein said gate body includes a multiplicity of stiffening profile members and a flexible hanging,
   wherein each stiffening profile member extends transversely to the lateral guides across said gate body and connects two respective associated hinge members, and
   wherein said flexible hanging substantially covers a full surface of one side of said gate body while extending across stiffening profile members and being affixed at each stiffening profile member.

2. The industrial gate in accordance with claim 1, wherein said flexible hanging is subdivided into several hanging segments.

3. The industrial gate in accordance with claim 1, wherein said flexible hanging is affixed across an entire width of the gate at a respective adjacent stiffening profile member.

4. The industrial gate in accordance with claim 1, wherein said flexible hanging is affixed at said respective adjacent stiffening profile member in positive engagement.

5. The industrial gate in accordance with claim 1, wherein said flexible hanging includes in a range of each stiffening profile member a reinforcing strip that engages in an undercut groove at said associated stiffening profile member.

6. The industrial gate in accordance with claim 5, wherein in portions of said gate body in which said flexible hanging extends across a stiffening profile member, the reinforcing strip is welded to said flexible hanging.

7. The industrial gate in accordance with claim 5, wherein one respective reinforcing strip is formed on edge sides of said flexible hanging or of each hanging segment thereof, respectively, which runs in parallel with said associated stiffening profile member.

8. The industrial gate in accordance with claim 1, wherein ends of each stiffening profile member engage in said hinge members so as to be accommodated therein when viewed in a direction of depth of said gate body, with sides thereof facing said flexible hanging substantially being flush with surfaces of said hinge members.

9. The industrial gate in accordance with claim 1, wherein in a closed condition of said gate body there are a hinge plane and a hanging plane, wherein said hinge plane is substantially defined by pivot axes of said hinge members that are interconnected such that they may be oriented at a relative angle, and said hanging plane is substantially defined by an extension of a major surface of said flexible hanging, with said hinge plane and said hanging plane not coinciding.

10. The industrial gate in accordance with claim 9, characterized in that said hinge plane and said hanging plane are arranged in immediate vicinity of each other.

11. The industrial gate in accordance with claim 1, characterized in that said flexible hanging is affixed to said stiffening profile members in respective locations adjacent a pivot axis of said hinge members that are interconnected such that they may be oriented at a relative angle.

* * * * *